US009795998B2

(12) United States Patent
Rattunde

(10) Patent No.: US 9,795,998 B2
(45) Date of Patent: Oct. 24, 2017

(54) WASHING DEVICE AND METHOD FOR TUBE SECTIONS

(71) Applicant: RATTUNDE & Co GmbH, Ludwigslust (DE)

(72) Inventor: Ulrich Rattunde, Bentwisch (DE)

(73) Assignee: Rattunde & Co GMBH, Ludwigslust (DE)

( * ) Notice: Subject to any disclaimer, the term of this patent is extended or adjusted under 35 U.S.C. 154(b) by 0 days.

(21) Appl. No.: 15/106,971

(22) PCT Filed: Dec. 19, 2014

(86) PCT No.: PCT/EP2014/078911

§ 371 (c)(1),
(2) Date: Jun. 21, 2016

(87) PCT Pub. No.: WO2015/097114

PCT Pub. Date: Jul. 2, 2015

(65) Prior Publication Data

US 2017/0001222 A1 Jan. 5, 2017

(30) Foreign Application Priority Data

Dec. 23, 2013 (DE) ........................ 10 2013 114 850

(51) Int. Cl.
*B65G 45/22* (2006.01)
*B08B 3/06* (2006.01)
(Continued)

(52) U.S. Cl.
CPC .................. *B08B 3/06* (2013.01); *B08B 3/04* (2013.01); *B08B 3/041* (2013.01); *B08B 9/023* (2013.01)

(58) Field of Classification Search
CPC .... B08B 3/06; B08B 3/04; B08B 9/02; B08B 9/023; B65G 45/22; H01L 21/02052
(Continued)

(56) References Cited

U.S. PATENT DOCUMENTS 3,687,144 A * 8/1972 Borcoman .............. B08B 3/045 134/134
7,252,102 B1 * 8/2007 Grass ......................... B08B 3/06 134/147
2011/0277795 A1 * 11/2011 Mendenhall .............. B08B 3/06 134/25.1

FOREIGN PATENT DOCUMENTS

AT 334168 B 1/1977
BE 361941 A 7/1929
(Continued)

OTHER PUBLICATIONS

International Searching Authority, International Preliminary Report on Patentability for PCT/EP2014/078911, Jun. 28, 2016, 9 pages, Original and Translation.

*Primary Examiner* — James R Bidwell
(74) *Attorney, Agent, or Firm* — Thomas B. McGurk

(57) ABSTRACT

A washing device is provided for elongate profile sections which have been cut to length, having a drum which is rotatable about a horizontally oriented axis of rotation, the drum having a plurality of receiving areas which are arranged next to one another along the circumference of the drum and into which elongate profile sections oriented along the longitudinal direction can be inserted, with a receiving opening for the elongate profile sections and a discharge opening for the elongate profile sections and an upper transport path for the elongate profile sections, the upper transport path running between the receiving opening and the discharge opening, wherein the upper transport path passes the axis of rotation on the side thereof facing away
(Continued)

Figure 1:
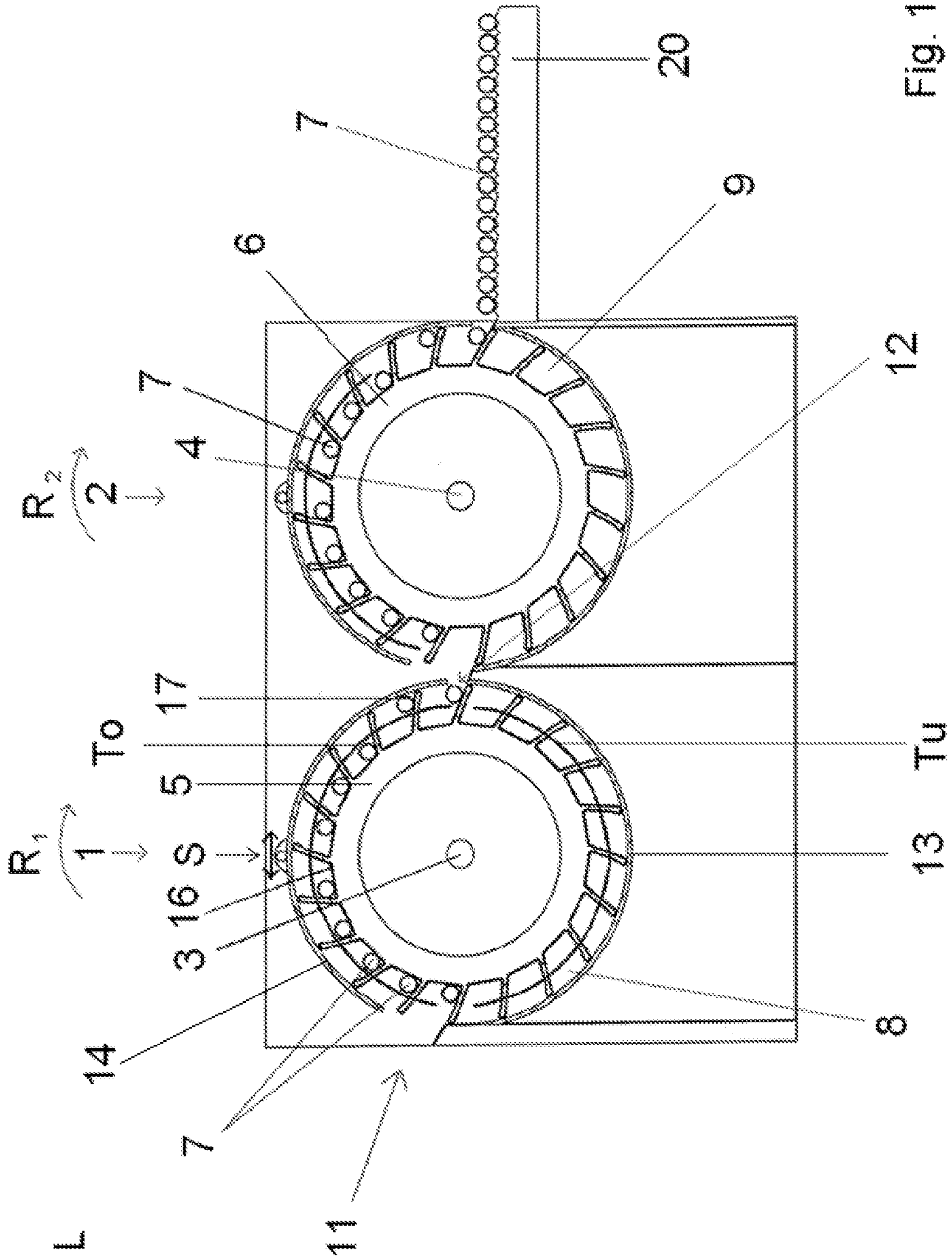

from the ground, wherein an opening width of the discharge opening is adjustable in the circumferential direction.

7 Claims, 2 Drawing Sheets

(51) Int. Cl.
*B08B 3/04* (2006.01)
*B08B 9/023* (2006.01)

(58) Field of Classification Search
USPC ........... 198/494, 495; 15/23, 28; 134/33, 48, 134/159
See application file for complete search history.

(56) References Cited

FOREIGN PATENT DOCUMENTS

| | | | | | |
|---|---|---|---|---|---|
| DE | 488072 | C | | 12/1929 | |
| DE | 9309162 | U1 | | 8/1993 | |
| DE | 20014470 | U1 | | 11/2000 | |
| EP | 327789 | | * | 8/1989 | ............... B05C 3/08 |
| NL | 19618 | C | | 3/1929 | |

* cited by examiner

WASHING DEVICE AND METHOD FOR TUBE SECTIONS

This application is a national stage filing under 35 U.S.C. §371 of International Application No. PCT/EP204/078911 filed on Dec. 19, 2014. This application claims priority of German Patent Application No. 10 2013 114 850.6 filed on Dec. 23, 2013. Both of the above listed applications are incorporated by reference in their entirety herein.

The invention relates to a washing device, according to the preamble of claim 1, and to a method for cleaning elongate profile sections which have been cut to length, according to the preamble of claim 7.

Washing machines for cleaning tube sections are known for example from EP 0 638 370 A1. One disadvantage with said washing machine, however, is that scratches may occur in the outer wall of sensitive tubes because tubes of small diameter in particular may prematurely fall out of the receiving areas at the time of discharge and may become scratched. In particular, the washing machine is not adjustable for tubes of different diameter.

AT 334168 discloses a device for separating a single layer of cut-to-length wires from a wire bundle. In said document, wire bundles are fed via a drum, which has blades, to a shaft of a guide part and via a feeder route from there are welded onto longitudinal wires by means of a mesh welding machine.

Besides increasingly high demands being placed on the precision when cutting elongate profiles to length, particularly tubes which may be in the micrometer range and below, increasingly high demands are also being placed on a gentle treatment, in particular of the outer surfaces of the cut-to-length elongate profiles. In particular, the cut-to-length elongate profiles may later be used as exhaust tubes and the like. In this case, the outer surfaces must have absolutely no scratches.

The object of the present invention is therefore to provide a washing device and a method for washing elongate profile sections which have been cut to length, which device and method enable the gentlest possible washing of elongate profile sections, in particular of different diameter.

With regard to the device, the object is achieved by a washing device of the type mentioned in the introduction having the features of claim 1.

It is known in principle to insert tube sections individually into receiving areas of a rotating drum and to pass water, air or the like through the receiving areas of the drum in order to clean the elongate profile sections. During this, the elongate profile section may be transported along an upper transport path above the axis of rotation of the drum or along a lower transport path below the axis of rotation of the drum.

The axis of rotation of the drum is preferably arranged parallel to the ground so as to make it more difficult for the elongate profile sections arranged in the receiving areas to slide.

The drum is advantageously delimited by a trough on its radially outer side, in the lower region facing towards the ground. If the elongate profiles inserted into the washing machine through a receiving opening are transported along the lower transport path to the discharge opening located opposite the receiving opening, the tubes roll and slide over the radial inner side of the trough and may become scratched in the process. If the tubes are transported according to the invention on the upper transport path from the receiving opening to the discharge opening, the tubes lie only on the radial inner side of the receiving areas during transport and roll, once the receiving area has passed an apex of the rotational movement, from the radially inner trailing corner to the radially inner leading corner of the respective receiving area. During a rolling movement, however, the tubes are scratched to a much lesser degree or not at all, unlike in the sliding procedure.

The receiving areas are preferably quadrangular in a cross-section perpendicular to the longitudinal direction. The side walls preferably point radially outwards in the transport direction along the upper transport path.

However, one problem when transporting the elongate profile sections along the upper transport path is that the leading side wall of the receiving area, from a particular rotational position onwards, slopes radially outwards and downwards and the tube sections in the receiving area then roll radially outwards. In order that the tube sections do not roll out of the receiving area of the drum, a cover according to the invention is provided, which delimits the drum in the radially outward direction above the axis of rotation.

According to the invention, an opening width of the discharge opening is adjustable in the circumferential direction. This prevents elongate profiles of circular cross-section from falling prematurely out of the receiving areas, in order then to be fed for further processing. By adjusting the opening width of the discharge opening, it is possible largely to prevent said elongate profiles from falling out of the receiving areas.

The opening width will preferably be understood to mean a size of the discharge opening or receiving opening in the circumferential direction. The opening width is preferably identical or substantially identical, that is to say rectangular or substantially rectangular, over the entire longitudinal extent.

Elongate profile sections will be understood here to mean profiles with a preferably circular outer circumference in cross-section over their entire longitudinal extent, preferably tubes. In particular, the tubes are made of metal, preferably stainless steel.

In one particularly preferred embodiment of the invention, a radially outer side of the drum is covered by a movable cover device which is rotatable about the axis of rotation, wherein the position of a longitudinal edge of the cover device defines the height of the discharge opening. The cover device may be configured as a metal sheet of rectangular cross-section which is adapted in terms of its curvature to the outer circumference of the washing drum. However, other materials and designs are also conceivable.

The cover device is preferably able to pivot back and forth in the circumferential direction about the axis of rotation of the drum. The opening width of the discharge opening is defined by a position of a longitudinal edge of the cover device and by a position of the longitudinal edge of the trough. By pivoting the cover device, it is possible to adjust the opening width, that is to say the height of an opening gap in the circumferential direction of the drum.

Preferably, the opening width corresponds to a diameter of the elongate profile sections plus preferably 5%, 10%, 15% or 20% of the diameter. The elongate profile sections washed during a washing operation preferably all have the same or substantially the same diameter. The diameter of each elongate profile is preferably identical over its entire longitudinal extent.

In one preferred embodiment of the invention, the direction of rotation of the drum is changeable. An upper and a lower transport path are thereby opened up, both of which run between the receiving opening and the discharge opening and pass the axis of rotation on the side thereof facing away from, and respectively facing towards, the ground.

Preferably, therefore, it is possible to change between a conventional washing operation using a lower transport path and a washing operation according to the invention using the upper transport path.

Advantageously, cleaning stations for the elongate profile sections transported in the receiving areas are arranged along the upper and/or lower transport path. These cleaning stations are preferably washing and/or drying stations. The washing stations are preferably characterized in that water flows in the longitudinal direction through the receiving area substantially over the entire cross-section of the receiving area and in doing so uniformly washes off the shavings over the entire longitudinal extent of the elongate profile sections.

In one preferred embodiment of the invention, the receiving areas are delimited by side walls which are inclined from radially inwards to radially outwards, wherein the side walls are inclined from radially inwards to radially outwards in the direction of rotation when the direction of rotation enables the upper transport path. As a result, the cut-to-length elongate profile sections can be transferred from one washing device to a subsequent washing device in that the tube sections roll out of the receiving area of the first washing device and into a receiving area of the second washing device, wherein the axes of rotation of the two washing drums may be arranged at the same height with respect to the ground.

With regard to the method, the object is achieved by a method for cleaning elongate profile sections which have been cut to length, having the features of claim 7. The method is particularly suitable for being carried out on one of the aforementioned washing devices.

According to the invention, a diameter of the elongate profile sections is determined prior to the insertion of the latter and an opening width of the discharge opening is adjusted in the circumferential direction on the basis of the measurement. Preferably, the opening width is slightly greater than the measured diameter, preferably 5%, 10% or 15% or 20% greater.

Advantageously, the diameters of the elongate profile are the same over the entire longitudinal extent of the elongate profile and the diameters of different elongate profile sections of a washing operation are likewise identical to one another.

Preferably, the elongate profile sections are oriented along the axis of rotation of a washing drum of the washing device prior to be inserted into the washing device. The elongate profile sections are then inserted via a receiving opening into receiving areas of the washing drum, whereby they automatically roll into the receiving areas. The drum is rotated about a horizontally oriented axis of rotation, and the elongate profile sections preferably automatically roll out of the receiving areas via a discharge opening.

According to the invention, the elongate profile sections are transported between the receiving opening and the discharge opening along an upper transport path, wherein the upper transport path passes the axis of rotation on the side thereof facing away from the ground. As a result, it is ensured according to the invention that the elongate profile sections inserted in the receiving chambers bear against the radial inner sides of the receiving chambers and merely roll forward within the receiving areas during transport and cannot become scratched in the process.

Advantageously, the elongate profile sections inserted in the receiving areas automatically roll radially inwards in the receiving area along the trailing side wall of the receiving area and into the trailing, radially inner corner of the receiving area. In the region of the discharge opening, the elongate profile sections automatically roll radially outwards onto the inner side of the movable cover device. Once the elongate profile sections, during the transporting thereof along the transport path, have passed a longitudinal edge of the cover, the elongate profile sections automatically roll out of the receiving area. This is preferably the case when the leading inner wall of the receiving area is rotated to the height of a lower edge of the discharge opening.

Figure 2:
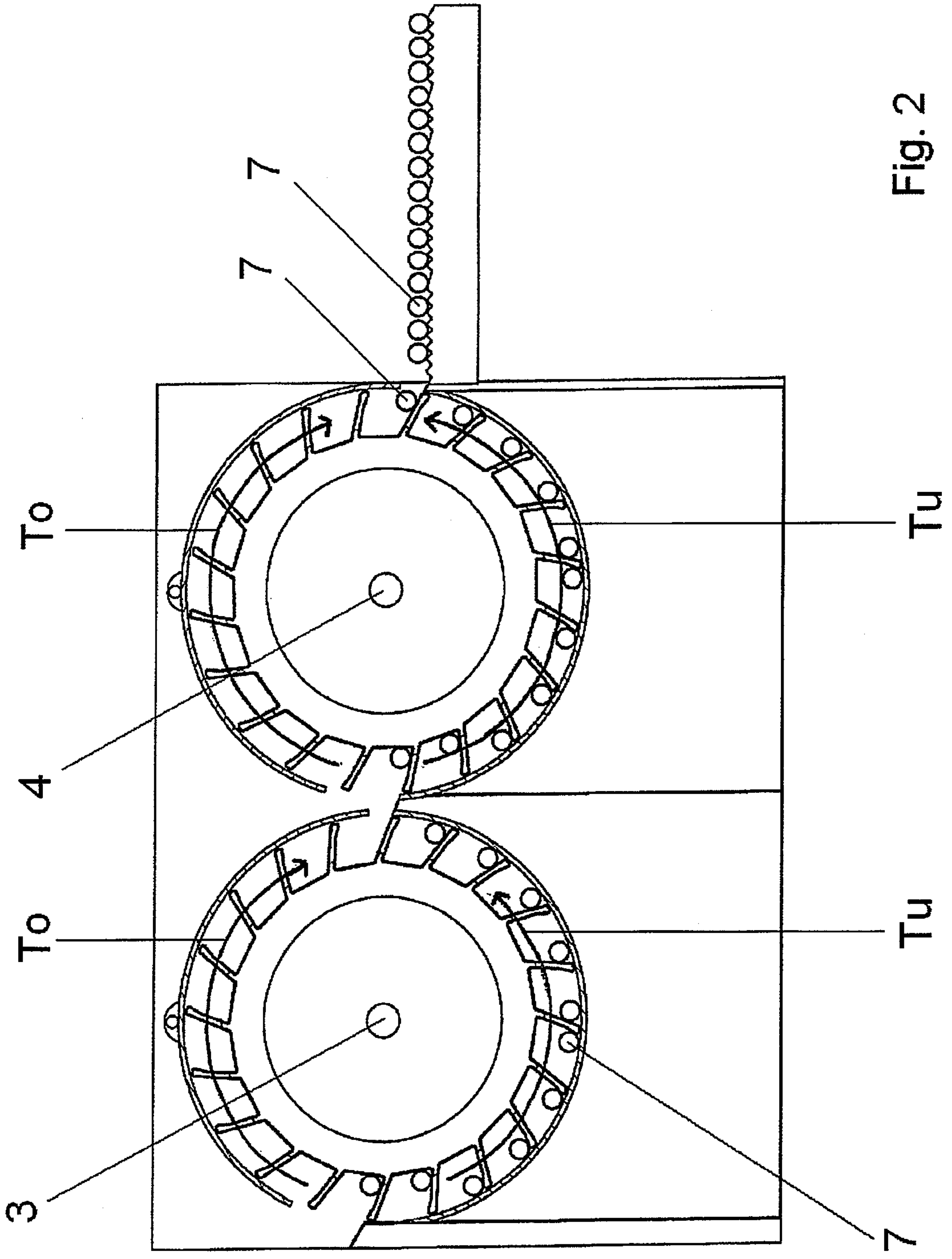

The invention will be described on the basis of an exemplary embodiment in two figures, in which:

FIG. 1 shows two washing machines according to the invention, in which in each case the upper transport path is being used, FIG. 2 shows the washing machines of FIG. 1 with a changed direction of rotation, so that in both washing machines the lower transport path is being used.

FIG. 1 shows two washing machines 1, 2 according to the invention which are arranged next to one another and are connected one behind the other in terms of their function. Each of the washing machines 1, 2 has a drum 5, 6 which is rotatable about an axis of rotation 3, 4 oriented in the longitudinal direction L. Each of the two drums 5, 6 is rotatable in the clockwise direction and also in the anti-clockwise direction in FIG. 1. In FIG. 1, the two drums 5, 6 are each rotating in the clockwise direction. The drums 5, 6 are driven by means of an electric motor (not shown). The direction of rotation is changeable.

The two washing machines 1, 2 shown in FIG. 1 are intended as a washing station for elongate profile sections which have been cut to length, in particular sawn to length, from an elongate profile, preferably an elongate metal profile, particularly preferably a long metal tube.

After being cut to length, the cut-to-length tube sections 7 are subjected to an after-treatment; in particular the tube ends thereof are chamfered, brushed or the like. At the end of the chain of machining steps or even in an intermediate step, the tube sections 7 are also washed by means of the washing machines 1, 2 according to the invention.

Each of the two drums 1, 2 in FIG. 1 may have a size of up to a few meters in the longitudinal direction L. The two drums 5, 6 are concentric about their respective axis of rotation 3, 4.

The first drum 5 along the machining path in FIG. 1 has 20 receiving areas 8 for in each case one tube section 7 or in each case one bundle of tube sections 7. The second drum 6, which follows the first drum 5 in the transport direction R1, R of the tube sections 7, likewise has 20 receiving areas 9.

Hereinbelow, the description of the first washing machine 1 also relates in a corresponding manner to the function of the second washing machine 2.

The washing machine 1 has a receiving opening 11 and a discharge opening 12 located opposite said receiving opening in relation to the axis of rotation 3. The receiving opening 11 is formed over substantially the entire longitudinal extent of the drum 5. The discharge opening 12 is likewise formed over the entire longitudinal extent of the drum 5.

In FIG. 1, the tube sections 7 are conveyed individually to the washing machine 1 and are individually received in the receiving areas 8 via the receiving opening 11. To this end, the tube sections 7 are conveyed parallel to the longitudinal direction L, by means of a conveyor belt (not shown) for example, to the washing machine 1 and then, upon reaching the receiving opening 11, automatically roll via a slope under the effect of gravity into a respective receiving area 8.

The rotational movement of the washing machine 1 is clocked. After a receiving area 8 has been newly filled via the receiving opening 11, the drum 5 of the washing machine 1 rotates through one-twentieth of the full circumference, and the next free receiving area 8 is made available to receive the next tube section 7. FIG. 1 shows ten tube sections 7 which are inserted in the first washing machine 1. In each case one tube section 7 is arranged in a receiving area 8.

The drum 5 of the washing machine 1 is delimited by a trough 13 to approximately half of its circumference on its side facing towards the ground. On its side facing away from the ground, the drum 5 is covered by a cover 14 which is displaceable or pivotable back and forth along the transport direction R1. The displacement movement is illustrated by a double-headed arrow. Like the trough 13, the cover 14 extends over the entire longitudinal extent of the drum 5.

The cover 14 extends along the circumference of the drum 5 by the sum of the sizes of the receiving opening 11 and discharge opening 12 in the circumferential direction less than half of the total circumferential length. On its two longitudinal sides running in the longitudinal direction L, the cover 14 is rectilinear so that the receiving opening 11 is formed as a rectangular gap and the discharge opening 12 is likewise formed as a rectangular gap. The heights of the two gaps, that is to say the size thereof, are adjustable along the circumferential direction by displacing the cover 14 back and forth along the circumferential direction.

The washing machine 1 according to the invention is suitable in particular for washing stainless steel tubes or generally tubes having an outer wall that is susceptible to scratching, or for cleaning tubes which must have no scratches on the outer wall, such as for example exhaust tubes, chair legs or the like. The transportation through the washing machine 1 is particularly gentle.

The tube sections 7 conveyed to the first washing machine 1 in FIG. 1 by means of a feed conveyor (not shown) are spaced apart from one another and each roll individually into an assigned receiving area 8. During the rolling process, no scratching occurs to the outer surfaces of the tube, or at least the risk of scratching is considerably lower than when the tubes are pushed over a surface for example. Since the drum 5 in FIG. 1 rotates in the clockwise direction, the tube sections are conveyed along an upper transport path To from the receiving opening 11 to the discharge opening 12. During approximately the first half of the upper transport path To, the tube sections 7 lie in the lower, ground-facing, trailing and radially inner corner of the respective receiving area 8 until the receiving area 8 has reached an apex S of the upper transport path To. At that point, once the radial inner wall 16 of the receiving area 8 has tilted from a positive into a negative slope along the circumferential direction, the tube section 7 rolls from the trailing inner corner to the leading inner corner of the receiving area 8. During this gentle rolling movement along the inner wall 16 of the receiving area 8, no scratches are produced. In the second section of the upper transport path To, the tube section 7 remains in the radially inner leading corner of the receiving area 8 until the leading side wall 17, which delimits the receiving areas 8 from one another, slopes radially outwards and downwards with respect to the ground, so that the tube section 7 rolls radially outwards along the leading side wall 17 until the tube section 7 butts against the radial inner side of the cover 14. The cover 14 is displaced so far forward in the transport direction R1 of the tube sections 7 that the discharge gap forming the discharge opening 12, which is formed by the longitudinal edge of the lower trough 13 and the longitudinal edge of the cover 14, has a height which corresponds to the diameter of the tube, preferably plus 10%, preferably plus 15%. The tube section 7, which on the last part of the upper transport path To is arranged at the radially outer leading corner, formed by the leading side wall 17 and the cover 14, falls out of the receiving area 8 only once the leading side wall 17 of the receiving area 8 has reached the height of the longitudinal edge of the trough 13.

If the cover 14 were not rotated far enough in the transport direction R1, the tube section 7 would roll out and fall out of the receiving area 8 too early, which might lead to damage.

After the first washing operation in the first washing machine 1, the tube section 7 is fed to a second washing machine 2. During the transport along the upper transport path To, the tube sections 7 are first washed and then pre-dried. The receiving areas 8 are in each case open at their two end sides, so that a flow of water can flow in the longitudinal direction L through each of the receiving areas 8 when the latter have reached a given position during their rotational movement, said flow of water freeing the tube section 7 inserted in the receiving area 8 of metal shavings and the like. The washing means (not shown) is preferably arranged between the receiving opening 11 and the apex S. A first pre-drying device (not shown) is preferably provided between the apex S and the discharge opening 12 and blows an air flow through the receiving area 8 respectively arranged in front of it.

A corresponding structure applies to the second washing machine 2.

After the tube sections 7 have rolled out of the second washing machine 2, they are conveyed away from the second washing machine 2 on a conveyor device 20. Air nozzles pointing in the longitudinal direction L at the height of the tube sections 7 may be provided along the conveyor device 20, which nozzles blow hot air at a temperature of up to 300° C. through the tube sections 7 and along the tube sections 7 in order to carry out final drying of the tube sections 7.

FIG. 2 shows the double washing machine 1, 2 of FIG. 1 in its second mode of operation. In this case, the tube sections 7 are each transported not along an upper transport path To but rather along a lower transport path Tu, which runs between the axis of rotation 3, 4 and the ground. This corresponds substantially to the conventional washing operation. However, the washing machine 1, 2 according to the invention makes it possible to switch back and forth between the washing operation according to the invention and the conventional washing operation. In this case, one washing machine 1, 2 can use the upper transport path To and the other washing machine 1, 2 can use the lower transport path Tu. In the conventional washing operation shown in FIG. 2, however, it may be disadvantageous for some tube sections 7 that the tube sections slide and are pushed along the inner side of the trough 13 and do not roll, so that in this case, at least when metal shavings are additionally present in the receiving area 8, scratches may occur on the outer walls of the tube sections 7.

LIST OF REFERENCES

1 washing machine
2 washing machine
3 axis of rotation
4 axis of rotation
5 drum
6 drum

7 tube sections
8 receiving area
9 receiving area
11 receiving opening
12 discharge opening
13 trough
14 cover
16 radial inner wall
17 leading side wall
20 conveyor device
L longitudinal direction
S apex
To upper transport path
Tu lower transport path
R transport direction
R1 transport direction

The invention claimed is:

1. Washing device for elongate profile sections which have been cut to length, comprising a drum which is rotatable about a horizontally oriented axis of rotation, said drum having a plurality of receiving areas which are arranged next to one another along a circumference of the drum and into which elongate profile sections oriented along a longitudinal direction can be inserted, comprising a receiving opening for the elongate profile sections and a discharge opening for the elongate profile sections and an upper transport path for the elongate profile sections, said upper transport path running between the receiving opening and the discharge opening wherein the upper transport path passes the axis of rotation on a side thereof facing away from ground, an opening width of the discharge opening is adjustable in a circumferential direction, and a radially outer side of the drum is covered by a movable cover device which is rotatable about the axis of rotation, and wherein a position of a longitudinal edge of the cover device defines a height of the discharge opening.

2. Washing device according to claim 1, wherein a direction of rotation of the drum is changeable and thereby opens up a lower transport path which runs between the receiving opening and the discharge opening and passes the axis of rotation on the side thereof facing towards the ground.

3. Washing device according to claim 1, wherein cleaning stations for the elongate profile sections transported in the receiving areas are arranged along the upper and/or lower transport path.

4. Washing device according to claim 1, wherein the receiving areas have side walls running from radially inside to radially outside and inclined in a direction of rotation when the direction of rotation enables the upper transport path.

5. Washing device for elongate profile sections which have been cut to length, comprising a drum which is rotatable about a horizontally oriented axis of rotation, said drum having a plurality of receiving areas which are arranged next to one another along a circumference of the drum and into which elongate profile sections oriented along a longitudinal direction can be inserted, comprising a receiving opening for the elongate profile sections and a discharge opening for the elongate profile sections and an upper transport path for the elongate profile sections, said upper transport path running between the receiving opening and the discharge opening wherein the upper transport path passes the axis of rotation on a side thereof facing away from ground, an opening width of the discharge opening is adjustable in a circumferential direction, wherein the discharge opening is configured as an opening gap, a lower edge of which, during a discharge cycle, is arranged at a height of a radially outer edge of a leading side wall of the receiving area and an upper edge of which is formed by a longitudinal edge of a cover device.

6. Method for cleaning elongate profile sections which have been cut to length, in which the elongate profile sections are oriented along a longitudinal direction, the elongate profile sections are inserted via a receiving opening into receiving areas which are arranged next to one another along a circumference of a drum, and the drum is rotated about a horizontally oriented axis of rotation and the elongate profile sections are removed from the receiving areas via a discharge opening, the elongate profile sections are transported between the receiving opening and the discharge opening along an upper transport path, wherein the upper transport path passes the axis of rotation on a side thereof facing away from ground, wherein a diameter of the elongate profile sections is determined prior to insertion of the elongate profile sections and an opening width of the discharge opening is adjusted in a circumferential direction by pivoting a cover device about the axis of rotation of the drum and in that the elongate profile sections inserted in the receiving areas automatically roll radially inwards against a radial inner wall of the receiving area, and the elongate profile sections in a region of the discharge opening automatically roll radially outwards against an inner side of the cover device.

7. Method according to claim 6, wherein the elongate profile sections automatically roll out of the receiving area only when a leading side wall of the receiving area is rotated to a height of a lower edge of the discharge opening.

* * * * *